May 5, 1964   J. D. EISLER ETAL   3,131,633
VELOCITY-MATCHING SEISMIC CHARGE UNIT
Filed Dec. 10, 1958   2 Sheets-Sheet 1

INVENTORS:
JOSEPH D. EISLER
DANIEL SILVERMAN
BY
Newell Potter
ATTORNEY

May 5, 1964  J. D. EISLER ETAL  3,131,633
VELOCITY-MATCHING SEISMIC CHARGE UNIT
Filed Dec. 10, 1958  2 Sheets-Sheet 2

INVENTORS:
JOSEPH D. EISLER
DANIEL SILVERMAN
BY
Newell Pottoff
ATTORNEY

United States Patent Office 3,131,633
Patented May 5, 1964

3,131,633
VELOCITY-MATCHING SEISMIC CHARGE UNIT
Joseph D. Eisler and Daniel Silverman, Tulsa, Okla., assignors to Pan American Petroleum Corporation, Tulsa, Okla., a corporation of Delaware
Filed Dec. 10, 1958, Ser. No. 779,430
14 Claims. (Cl. 102—21.6)

This invention relates to seismic geophysical surveying and is directed to improvements in the explosives used for generating seismic waves. More specifically, it is directed to an elongated charge array having, in the direction of its length, a detonation velocity matching the seismic wave propagation velocity in the medium where the charge is to be detonated. The term "matching" as used herein is to be understood as including both the usual sense of "equal" and also intentional deviations from equality, as when the detonation velocity of a charge is purposely made somewhat greater or less than the formation seismic-wave velocity to vary the energy-directive properties of the charge.

Elongated velocity-matching explosive charges are now being used with increasing frequency for generating seismic waves in seismic geophysical exploration, due to their ability to reduce secondary or "ghost" reflections, ground roll, and other shot-generated noises in relation to the reflected energy. The two general types of charge construction in use are (1) a continuous length or column of low-velocity explosive and (2) an array of spaced high-velocity cartridges coupled by delay connectors. Both types of charge construction have certain advantages and disadvantages.

Theoretically, the continuous type is most free of undesirable noise generation, but it is commerically supplied only in certain discrete values of detonation velocity and in rather large total weights of explosive. Reduction of the explosive weight per unit length is not feasible because the explosive material used does not detonate reliably when its cross-sectional area is less than a certain substantial size. The fixed length of this charge as manufactured may be longer or shorter than desired for conditions in any given bore hole. Variation of the detonation velocity or explosive weight distribution along the length of the continuous charge is difficult or virtually impossible.

An array of spaced high detonation velocity cartridges is more flexible as regards length of the array, total weight of explosive, and variable distribution of explosive weight and velocity, but the delay connectors generally available have only certain discrete values of length and delay. Some types of such connectors also are rather inaccurate in providing their nominal time delay, and they frequently lack convenience for rapid assembly into rugged charge arrays.

It is a primary object of our invention to provide, for incorporation in an array of spaced charges, a novel and improved charge and/or delay unit which avoids the foregoing noted disadvantages. A more specific object is to provide an adjustable charge or delay unit for coupling into elongated charge arrays, with substantially complete flexibility as to array length, total weight of explosive and its distribution along the array, and detonation velocity both over-all and within any part of the array. A still further object is to provide an explosive unit which is highly accurate as to the time delay or the effective detonation velocity provided, safe to transport and handle, inexpensive to manufacture, and easy to use and adapted for building an elongated charge array that is rugged and reliable for loading into partly blocked shot holes. Other and further objects, uses, and advantages of the invention will become apparent as the description proceeds.

Stated briefly, the foregoing and other objects are accomplished by an elongated tubular unit containing a flexible detonating cord of constant, high detonation velocity, and of a length sufficient to provide a certain maximum time delay. The total cord length is substantially greater than the length of the unit. One end of the cord is movable relative to the other in such a way that the resultant velocity provided by the unit is adjustable. This is done in one or both of two ways: (1) by varying the length of the tubular unit and thus changing the axial distance traveled by the detonation wave as it travels from end to end of the fixed length of the cord; or (2) by keeping the tubular unit length constant and varying the length of the detonating cord between the ends of the unit, thus varying the total delay time over the given interval of axial length. Preferably, but not necessarily, the ends of the detonating cord terminate in pellets of high detonation velocity explosive.

When a plurality of such units are coupled together into an elongated charge array, these small explosive pieces may constitute the main sources of energy. For greater total energy, additional explosive sticks may be inserted between the delay units, however, and these small explosive pieces then serve both as energy sources and as the priming or detonating means which assure the transfer of detonation between the cord and the additional sticks.

In the event the small terminal pellets of explosive are omitted from each of the charge units, then special means are necessary to obtain contact such as to insure that the propagation of detonation takes place between the end of the detonating cord and the charge unit to be detonated and vice versa. One embodiment of our invention accordingly provides special cord end-holding means for making such a contact and protecting it from moisture and the like which might interfere with proper transmission of the detonation.

This will be better understood by reference to the accompanying drawings forming a part of this application and illustrating a number of typical embodiments and modifications of the invention. In these drawings, FIGURE 1 is a diagrammatic earth cross-section illustrating the use of an elongated explosive charge array, with its delay connecting units between charges shown partly in section, embodying the invention for seismic geophysical surveying;

FIGURES 2 to 6, inclusive, are diagrammatic longitudinal cross-sections of various modifications of a delay unit embodying the invention;

Figures 1, 8, 9:
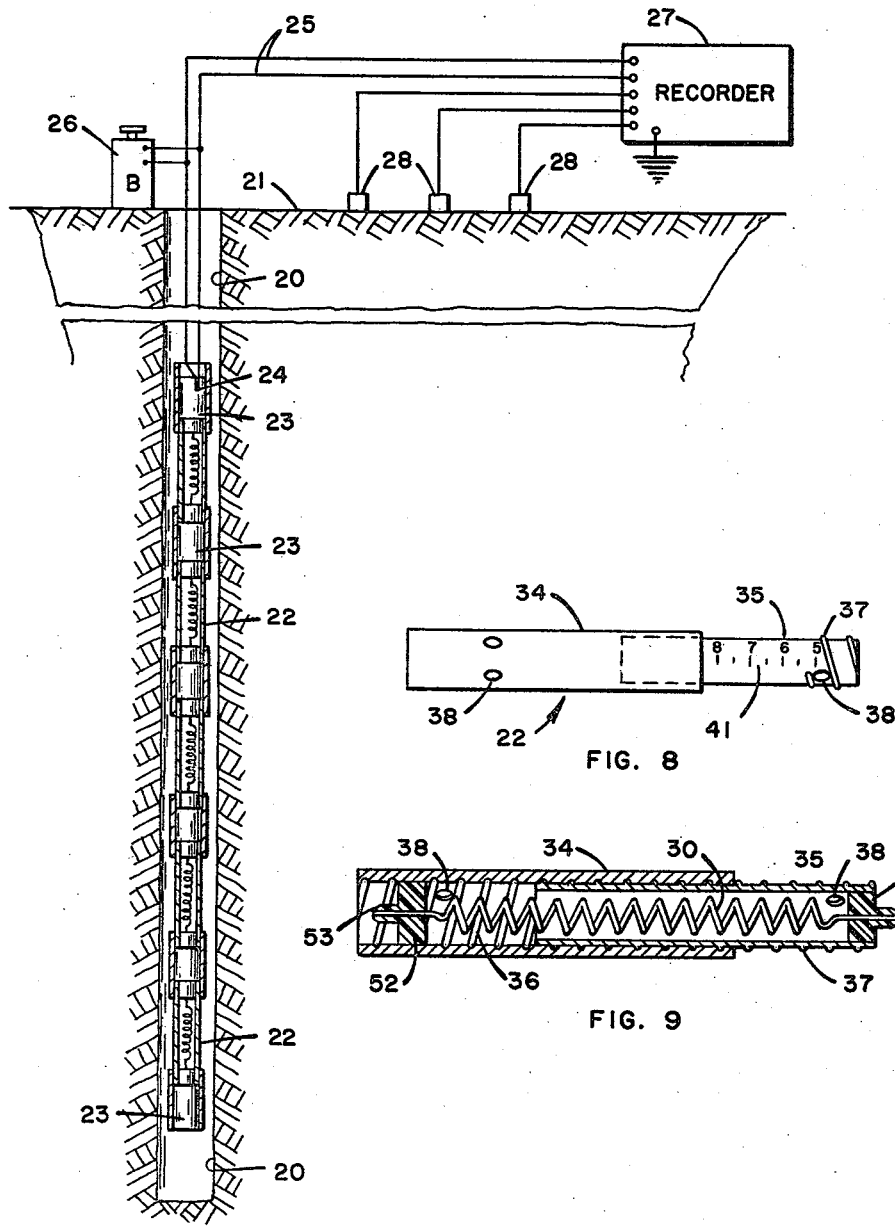
FIGURE 8 is an external view of a delay unit embodying the invention.
FIGURE 9 is a diagrammatic cross-section view of an alternative embodiment of the invention.
Figure 2:
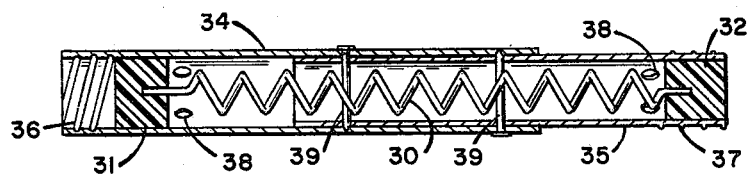
Figure 3:
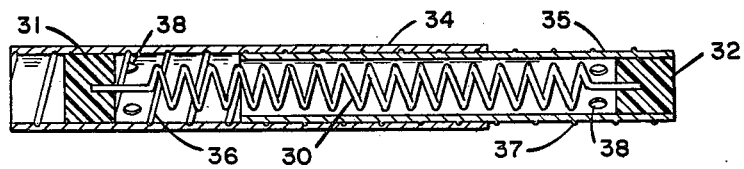
Figure 4:
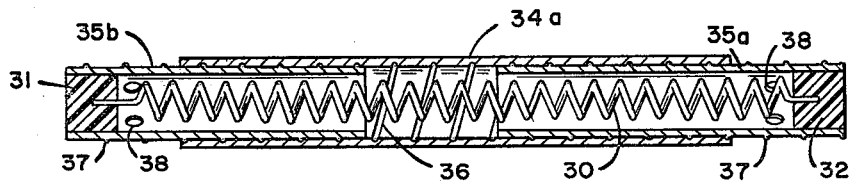

Referring now to these drawings in detail and particularly to FIGURE 1 thereof, a typical embodiment of the invention is shown in use in a shot hole for the generation of seismic waves in seismic geophysical surveying. Thus, into a shot hole 20 extending to a substantial depth below the earth's surface 21, at a location where it is desired to generate seismic waves, is lowered a plurality of delay units 22 coupling together a plurality of explosive charges 23 into an elongated explosive charge array. For the purpose of detonating this charge array, a detonating cap 24 in the uppermost of charges 23 is connected by electrical leads 25 to a blaster 26 at the ground surface 21 and to a recorder 27 for recording the instant of initiating the detonation. Also connected to the recorder 27 are a plurality of seismometers 28 at the ground surface spaced at any desired distance from each other and from the upper end of the shot hole 20 in a manner well known in the art.

Further, as is well known in the art, the delay units 22 and charge units 23 are so adjusted and arranged that the rate of travel of the detonation wave from the cap 24 along the length of the charge array is matched to the seismic-wave propagation velocity of the earth medium surrounding the shot hole 20. In operation, therefore, seismic waves created in the surrounding earth medium by the detonation in sequence of the various charge units 23, after transmission, reflection, and refraction in the earth's subsurface, are subsequently received by the detector units 28 and recorded by the recorder 27.

As it is to the particular manner of construction of the individual delay connectors 22 that the present invention is addressed, several different ways of constructing such delay units are illustrated in FIGURES 2 to 6 of the drawings. Thus, as appears in FIGURE 2, each unit 22 may comprise a length of detonating cord 30 terminating in a pair of spaced high-explosive pellets 31 and 32. These are contained within a tubular member made up of a pair of telescoping tubular parts 34 and 35. Suitable provision is made for inter-connecting a number of such units with each other and/or with additional explosive sticks, such as by providing external threads 37 on the part 35 and internal threads 36 on the part 34. As is apparent from the figure, the total length of the detonating cord 30 is substantially greater than the spacing between the charges 31 and 32. The travel time of a detonation wave along the cord 30 from the charge 31 to the charge 32, however, depends only upon the total length of the cord 30 and is independent of the spacing between the charges 31 and 32. The latter is adjustable by telescoping the parts 35 and 36, the spacing of the charge units 31 and 32 in this way determining the effective detonation velocity across this space. In other words, if L is the axial length of unit 22 and T is the travel time of the detonation wave along the cord 30 from end to end, then, the effective axial detonation velocity V chosen for matching a certain seismic wave propagation velocity is given by the simple equation $$V = \frac{L}{T}$$

The required extension of the parts 34 and 35 for various values of the axial velocity V is preferably visually indicated in some manner, for example, as is shown in FIGURE 8, by providing a velocity scale 41 on the outside of the part 35. Once the proper extension L of the telescoping parts has been obtained, they are retained in that position by suitable means such as staples or pins 39 which pass through the walls of both parts and extend diametrically across the tubular members 34 and 35 between convolutions of the cord 30. For ease in lowering into water-filled shot holes, pressure-equalizing openings 38 are preferably provided in parts 34 and 35 near the ends of the cord 30.

There are a number of possible ways by which the telescoping members 34 and 35 may be adjusted relatively lengthwise and maintained in place. Thus, as in FIGURE 3, the external threads 37 may extend the entire length of the inner member 35 and engage the internal threads 36 likewise extending throughout the length of the member 34. Or, as appears in FIGURE 4, the inner tubular member may be divided into two portions 35A and 35B which project from both ends of the outer tubular member 34A, which is provided with both right- and left-handed internal threads to engage corresponding external threads on the members 35A and 35B respectively. Thus, by rotating only the outer sleeve 34A while maintaining inner tubular members 35A and 35B stationary, changes in the effective spacing of the charges 31 and 32 can be made without twisting the detonating cord 30.

Figure 5:
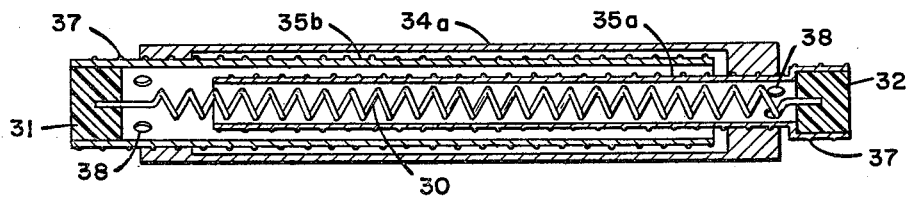

In all of the embodiment described above it may be noted that the possible extension of the telescoping members 34 and 35 is somewhat less than the length of either member. This accordingly limits the possible adjustment of the effective detonation velocity of the unit 22 to a range of somewhat less than two to one. In FIGURE 5 is shown a modification of the invention which is not limited in this way. This is similar in most respects to the embodiment of FIGURE 4 with the additional provision that the individual tubular members 35A and 35B are of different diameter so as to telescope within each other. The right- and left-handed threads on the member 34A are of different diameters at the two ends of the member, so as to engage the external threads of the respective members 35A and 35B. As will be apparent, this construction permits an extension of the unit to a length substantially greater than twice its length when closed and accordingly provides an increased range of adjustment for the effective detonation velocity.

Figure 6:
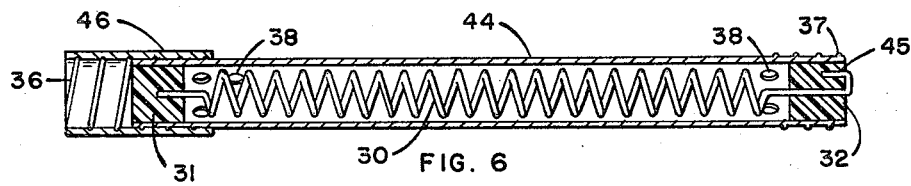

An alternative method of adjusting the effective detonation velocity between the charges 31 and 32 is illustrated in FIGURE 6. Thus, the charges 31 and 32 are placed at the ends of a non-telescoping tubular member 44 of fixed length having the cord 30 extending through its interior. The total length of cord 30 is such as to provide the greatest anticipated travel time needed over a distance equal to the length of member 44. In this case, adjustment of the effective velocity of detonation between the charges 31 and 32 is made by drawing out a proper length of the cord 30 through the opening in the center of the charge 32, the end of the cord, after it has been cut to the proper length, being then inserted back within the charge 32 as indicated at 45. This places the exposed ends of the cord 30 in intimate contact with the explosive 32 as is necessary to insure proper propagation of the detonation from the cord to the charge material. External threads 37 at each end of the tube 44 provide for connection to similar units or to additional sticks of explosive 23 by means of internally threaded collars 46.

Figure 7:
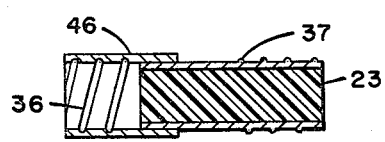
FIGURE 7 is a diagrammatic cross-section of an explosive charge adapted for coupling to the units of the invention in assembling elongated charge arrays.

In using all of the foregoing embodiments of the invention the threaded coupling members are such as to permit either coupling the units directly to each other end to end or coupling to one or more supplementary explosive charges 23 like that of FIGURE 7. Thus, the latter are preferably provided with the same type of external threads 37 and internal threads 36, on the projecting sleeve 46, as are used on the delay units 22. With such a coupling arrangement, the charges 23 can be manufactured in a single size or small variety of sizes; and any number can be connected together to make exactly the total charge weight desired. A further advantage is that by using different weights or sizes of the supplementary charges 23 at different places in an array, substantially any desired non-uniform distribution of charge weights is readily feasible.

In order that small total weights of explosive can be utilized when desired, the weights of the individual pellets 31 and 32 should not be too large. Thus, a size in the range from about one to sixteen ounces—typically about four ounces—would appear to be preferable. Such a charge size materially aids propagation of the detonation along and across the joints of an array but contributes only a limited amount of explosive power when such is needed.

A still further modification of the invention is illustrated in FIGURE 9. Thus, as was stated briefly above, while it is preferable that the ends of the detonating cord 30 terminate in the individual charges 31 and 32 forming a part of the unit 22, these charges are not essential and may be omitted by coupling the cord 30 directly to the explosive cartridge 23. The unit will then be constructed somewhat as shown in FIGURE 9. Thus, the ends of the cord 30 are firmly held by supporting members 51 and 52, which are respectively anchored or molded in the ends of the telescoping parts 34 and 35. Since it is essential that the ends of the cord 30 be in intimate contact with the explosive material to be detonated, the cord preferably extends outwardly through the supporting means 51 and 52 and passes through the center of a projecting rod or spike 53 thereon. Projection 53 is preferably sharpened at its end so that it may be driven into and imbedded in the interior of the explosive stick 23 to which it is connected.

In order to protect the exposed ends of the cord 30 from absorbing moisture and the like, which may interfere with its proper operation, these ends are preferably covered with a thin layer of wax or the like for waterproofing. The members 51 and 52, including the projections 53, may be formed of any material desired but are advantageously molded of an inexpensive plastic or synthetic resin. The pointed or tapering shape of the projecting members 53 is such that it not only places the ends of the cord 30 in direct contact with the explosive material of the charge 23, but also excludes bore hole water from entering subsequently and affecting the ability of the cord and charge materials to detonate properly.

The form and nature of the detonating cord 30 are matters of some importance. Until fairly recently, the detonating cord commercially available under the name of Primacord contained substantial amounts of explosive material per unit length of cord. The power of this material was such that if two pieces of the cord were in contact, detonation could be transferred from one to the other; or, if they were not in close contact but merely closely spaced, the detonation of one could sever the other and render it useless. More recently, however, detonating cords with quite small amounts of explosive per unit length have been successfully manufactured and made available commercially. With these "low-energy" detonating cords, as they are known, it is no longer necessary that adjacent portions of the cord be physically separated by a definite spacing, since even if they are in contact, cross-detonation or cutting of one cord by the other does not occur. With such low-energy cords, which are preferred for use in the present invention, detonation propagation occurs only from the end of the cord, and therefore special care must be taken to insure contact of the ends of the cord with the explosive to be detonated, as has been pointed out in the above description of various embodiments of the invention where this requirement is satisfied.

It should be noted, however, that with older forms of the detonating cord containing a higher explosive content per unit length, the objectives of the invention can still be accomplished by keeping the convolutions of the cord well separated, as by forming the cord into a helix or the like such that adjacent turns or portions of the cord are at least one-half inch from each other at all times. This can readily be accomplished in a number of different ways in the present invention, one being by coating the cord with a resilient synthetic resin which imparts to the helix a springy characteristic. Accordingly, the spacing of adjacent turns remains relatively uniform regardless of the length of the unit 22.

By way of example but not of limitation, a delay unit embodying the invention may employ a twenty-foot length of the cord 30. With a detonation velocity of about 20,000 feet per second, this provides about 1 millisecond delay. If the minimum length of the unit 22 is five feet and the maximum nine feet, any resultant axial detonation velocity V from 5,000 to 9,000 feet per second can be accurately predetermined. It will be apparent how different lengths of cord 30 and of the unit 22 can be arranged to provide the same or different values of axial velocity V.

While our invention has been described by referring to the foregoing specific details and embodiments, it is to be understood that its scope should not be considered as limited to the details set forth. The scope of the invention, however, should properly be ascertained by reference to the accompanying claims.

We claim:

1. An adjustable detonation-transmitting delay unit for spacing apart and operatively connecting adjacent explosive charges of an elongated charge array adapted to generate seismic waves and to match the detonation velocity along the array to the seismic-wave propagation velocity of a surrounding medium, said delay unit comprising a tubular member of a substantial length at least equal to the spacing of said adjacent charges coupled thereby, coupling means at each end of said member for connecting it into said array, a flexible high-detonation-velocity detonating cord extending through the interior of said member, the length of said cord being substantially greater than the minimum length of said member, and means for holding the ends of said cord substantially at the ends of said member, one of said cord ends being movable relative to the other in the lengthwise direction of said member to vary at least one of the variables L and T in the equation $$V = \frac{L}{T}$$

where L is the axial length of said unit, T is the travel time of a detonation wave from end to end of said unit, and V is the effective axial velocity of said detonation wave, which is variable until the time of connecting said unit into said array and is chosen to match the seismic wave propagation velocity of the medium wherein said array is to be detonated.

2. A delay unit as in claim 1 in which said tubular member comprises at least two telescoping parts, whereby L in said equation is varied by the telescoping of said parts, and means for maintaining said parts in fixed relative positions.

3. A delay unit as in claim 2 in which said maintaining means comprises means penetrating both walls of said telescoping parts where they are in contact.

4. A delay unit as in claim 2 in which said maintaining means comprises inter-engaging threads on said telescoping parts, whereby L is varied by relative rotation of said parts.

5. A delay unit as in claim 4 in which there are three telescoping parts, two of which telescope with the third.

6. A delay unit as in claim 4 in which there are three telescoping parts of three different diameters, whereby each telescopes with the other two.

7. A delay unit as in claim 1 in which said cord-end-holding means comprises two blocks of high-detonation-velocity explosive, one at each end of said tubular member.

8. A delay unit as in claim 7 in which at least one of said blocks has a central opening through which said cord may be drawn to vary its length and thereby vary T in said equation.

9. A delay unit as in claim 1 in which said cord-end-holding means comprises two axially outwardly extending projections at the ends of which said cord ends are exposed, one at each end of said tubular member.

10. A delay unit as in claim 9 wherein said tubular member comprises at least two telescoping parts, whereby L in said equation is varied by the telescoping of said parts.

11. An adjustable detonation-transmitting delay unit for use in seismic surveying as part of an elongated array of spaced explosive charges wherein said unit is the coupling and detonation-transmitting means between each two adjacent charges of said array, said delay unit comprising two telescoping tubular members of a combined length which is substantial and at least equal to the spacing of the said two adjacent charges coupled thereby, a flexible high-detonation-velocity detonating cord extending through said tubular members substantially from end to end of said unit, a charge of high-detonation-velocity explosive enclosing each end of said cord substantially at the ends of said unit, means at each end of said unit for coupling it into said array, and means for maintaining said telescoping members fixed relative to each other with a spacing L between ends of said cord to produce an effective axial detonation velocity V matching the seismic wave propagation velocity in the medium wherein said array is to be detonated, V and L being related according to the equation $$V = \frac{L}{T}$$

where T is the travel time of a detonation wave from end to end of said cord.

12. An adjustable detonation-transmitting delay unit for use in seismic surveying as part of an elongated array of spaced charges wherein said unit is the coupling and detonation-transmitting means between each two adjacent charges of said array, said delay unit comprising a tubular member of a substantial length which is at least equal to the spacing of the two explosive charges of said array to be coupled thereby, two cord-holding charges of high-detonation-velocity explosive each fixed at one of the two ends of said member, a flexible high-detonation-velocity detonating cord extending through said member between said charges, both ends of said cord being embedded within said charges, the portion of said cord adjacent at least one of said ends extending through an opening in the corresponding cord-holding charge to the outside thereof, whereby said cord may be drawn out through said opening and cut off to vary the cord length within said member between said cord-holding charges and thereby adjust T in the equation $$V = \frac{L}{T}$$

where L is the axial length of said unit, and V is the effective axial detonation velocity chosen to match the seismic wave propagation velocity of the medium wherein said array is to be detonated, and T is the travel time of a detonation wave from end to end of said cord, and means on said member for coupling it into said array.

13. An adjustable detonation-transmitting delay unit for use in seismic surveying as part of an elongated explosive charge array formed of a plurality of coupled members wherein said unit forms at least alternate ones of said coupled members, said delay unit comprising an elongated tubular member of substantial length, coupling means at each end of said tubular member for coupling it into said array, a flexible high-detonation-velocity detonating cord extending through the interior of said tubular member, the length of said cord being substantially greater than the minimum length of said tubular member, and means for holding the ends of said cord substantially at the ends of said tubular member, one of said cord ends being movable relative to the other in the lengthwise direction of said member to vary at least one of the variables L and T in the equation $$V = \frac{L}{T}$$

where L is the axial length of said unit, T is the travel time of a detonation wave from end to end of said unit, and V is the effective axial detonation velocity of said detonation wave, which is variable until the time of connecting said unit into said array and is then chosen to match the seismic wave propagation velocity of the medium wherein said array is to be detonated.

14. A rigid connecting device of adjustable length for joining explosive charges which comprises an outer rigid elongated tube, an inner rigid elongated tube having an outside diameter slightly smaller than the inside diameter of said outer tube, slidably mounted and nested at least partially within said outer tube to form a tubular telescoping assembly, the length of which assembly is adjustable to permit variation in the spacing of said explosive charges by sliding one of said tubes with respect to the other to vary the degree of nesting of the inner tube within the outer tube; a connecting means at each end of said assembly for connecting an explosive charge thereto, one of said connecting means including a primary charge of detonating explosive; and a length, at least equal to the maximum extensible length of said tubular telescoping assembly, of a fixed-time, delay-producing, detonating, connecting cord within said assembly, one end of which cord is retained by one of said connecting means and the other end of which is retained by the other of said connecting means, a substantial portion of said length of connecting cord being coiled when the telescoping assembly is unextended and being adapted to uncoil proportionately as the assembly is extended in length.

References Cited in the file of this patent
UNITED STATES PATENTS

| | | |
|---|---|---|
| 1,312,212 | Saloun | Aug. 5, 1919 |
| 1,493,881 | Jones et al. | May 13, 1924 |
| 1,988,467 | Wiley | Jan. 22, 1935 |
| 2,377,151 | Huber | May 29, 1945 |
| 2,468,274 | Riley | Apr. 26, 1949 |
| 2,609,885 | Silverman | Sept. 9, 1952 |
| 2,755,878 | Smith | July 24, 1956 |
| 2,775,200 | Guenter | Dec. 25, 1956 |
| 2,796,834 | McCaffery et al. | June 25, 1957 |
| 2,808,894 | Eisler et al. | Oct. 8, 1957 |
| 2,823,609 | Johnson et al. | Feb. 18, 1958 |
| 2,887,053 | Itria et al. | May 19, 1959 |
| 2,992,611 | Felch | July 18, 1961 |

FOREIGN PATENTS

| | | |
|---|---|---|
| 146,238 | Australia | Apr. 29, 1952 |

OTHER REFERENCES

Shock: "The Progressive Detonation of Multiple Charges in a Single Seismic Shot," Geophysics Magazine, vol. XV, No. 2, April 1950, pages 208–218.